Figure 1:
Figure 1:
Figure 1:
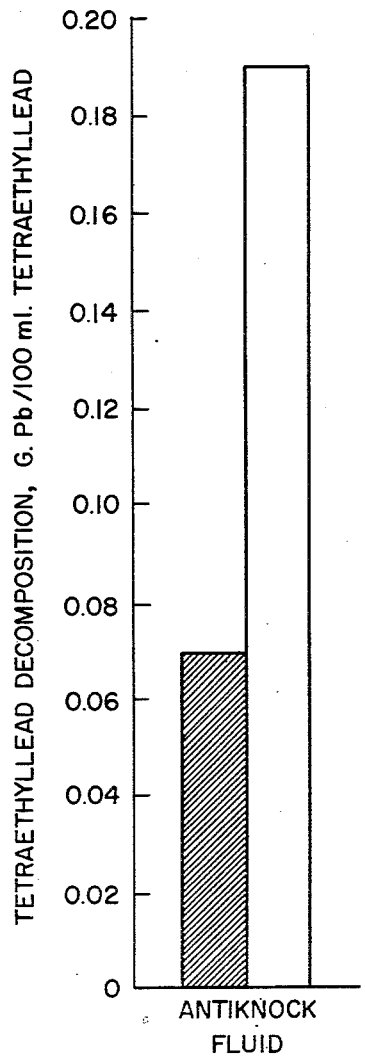

May 27, 1958  G. G. ECKE ET AL  2,836,568
STABILIZED FUEL ANTIKNOCK
Filed Dec. 2, 1955

4-METHOXY-2,6-DI-TERT-BUTYL PHENOL

4-METHYL-2,6-DI-TERT-BUTYL PHENOL

GEORGE G. ECKE
ALFRED J. KOLKA
INVENTORS

BY

United States Patent Office 2,836,568
Patented May 27, 1958

---

2,836,568
STABILIZED FUEL ANTIKNOCK

George G. Ecke, Ferndale, and Alfred J. Kolka, Birmingham, Mich., assignors to Ethyl Corporation, New York, N. Y., a corporation of Delaware Application December 2, 1955, Serial No. 550,520

4 Claims. (Cl. 252—386)

This invention relates to the stabilization of lead antiknock compounds and antiknock fluids containing them.

It is known that alkyllead antiknock materials, such as tetraethyllead, and also concentrated antiknock fluids containing organic halide scavengers mixed with such materials deteriorate in the presence of oxygen, air or ozone. The evidence of such decomposition is ordinarily a haze or even a sludge precipitate. Such deterioration results in mechanical difficultes caused by the precipitated solids such as plugged filters and fuel lines and deposition in carburetor jets and intake manifolds.

An object of this invention is to provide effective means for preventing the oxidative deterioration of alkyllead antiknock materials and fluids. Another object is to provide concentrated antiknock compositions which are rendered stable on storage even when in contact with oxygen, air or ozone by the presence therein of a small but effective quantity of a stabilizer. Other objects will be apparent from the ensuing description.

The above and other objects are accomplished by providing an antiknock composition wherein the principal antiknock ingredient is an alkyllead antiknock compound, and as a stabilizer therefor, a small stabilizing amount of a 4-methoxy-2,6-di-tert-alkyl phenol. Such antiknock compositions preferably contain a scavenger complement, although this is not essential to the present invention since it is often desired to store a tetraalkyllead compound in substantially pure state for long periods of time. This invention makes this possible by virtually eliminating oxidative deterioration of lead alkyls.

It is known in general that certain 2,6-dialkyl-4-alkoxy phenols are capable of preventing the decomposition of unsaturated gasoline, particularly cracked and polymer gasoline. Such unsaturated gasolines tend to form undesirable gums on storage. In general, this problem of stabilizing unsaturated gasoline is distinct from the problem of stabilizing alkyllead antiknock compounds and concentrated antiknock fluids containing such alkyllead compounds. In this latter problem the role of oxygen is little understood and its significance has not been established. It is clear, however, that the deterioration of alkyllead antiknock compounds is very different from the deterioration of unsaturated gasolines because in the former the mechanism does not involve oxidation of carbon-to-carbon unsaturated bonds—the mechanism by which unsaturated gasoline is deteriorated when in contact with oxygen. It is also known that antiknock fluids comprising tetraalkyllead antiknock compounds and organic halide scavengers are particularly susceptible to deterioration when in contact with oxygen, air or ozone and that this deterioration involves chemical interaction between the halogen atoms originally present in the scavenger and the tetraalkyllead compound. It is believed that intermediate decomposition products are formed and that these act as self-perpetuating decomposition accelerators.

Among the features of the stabilizers of this invention—4-methoxy-2,6-di-tert-alkyl phenols—is their outstanding effectiveness in inhibiting oxidative deterioration of lead alkyls even under severe conditions.

The 4-methoxy-2,6-di-tert-alkyl phenols used as stabilizers pursuant to this invention possess the general formula

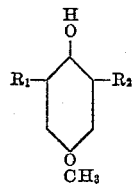

wherein $R_1$ and $R_2$ are tertiary alkyl radicals. It is preferred that these tertiary alkyl radicals contain from 4 to 8 carbon atoms because these compounds are the most effective of the class. In addition, it is further preferred that $R_1$ and $R_2$ be the same tertiary alkyl radical because these compounds are more easily prepared and are less expensive. The particularly preferred stabilizer of this invention is 4-methoxy-2,6-di-tert-butylphenol. This compound possesses outstanding effectiveness as a lead alkyl stabilizer even when used at very low concentration and is readily available at low cost.

The particular amount of the 4-methoxy-2,6-di-tert-alkyl phenol stabilizer used in the embodiments of this invention is dependent upon several factors. The amount used is governed by: (1) the type of conditions or service to be encountered; that is, the temperatures and fluctuations thereof and the amount of oxygen, air and/or ozone encountered during storage, handling and use; and (2) the chemical makeup of the particular scavenger complement used in accordance with certain of the embodiments of this invention. Generally speaking, amounts between about 0.01 and about 2.0 percent by weight based on the weight of the lead alkyl antiknock material are satisfactory, although greater or lesser amounts may be employed under varying conditions such as those described above. Thus, the amount of stabilizer used is that which is sufficient to inhibit deterioration of the antiknock composition in which it is employed when such composition is placed in contact with air.

The alkyllead antiknock agents which are stabilized according to this invention are represented by such compounds as tetramethyllead, tetraethyllead, tetrapropyllead, tetrabutyllead, dimethyldiethyllead, trimethylethyllead, and the like, or mixtures thereof. Such compounds containing from 4 to about 16 carbon atoms, one atom of lead and a plurality of lead to carbon linkages, are capable of increasing the octane quality of gasoline when employed therein in antiknock quantities—0.5 to 6.5 grams of lead per gallon. Of such compounds, tetraalkyllead compounds having from 4 to about 12 carbon atoms have superior volatility characteristics from the standpoint of engine induction and are thus preferred. Halogen-containing alkyllead compounds, such as triethyllead bromide, can also be stabilized according to this invention.

The scavengers which are preferably, but not necessarily present in the compositions of this invention are organic halide compounds which react with the lead during combustion in the engine to form volatile lead halide. The halogen of these scavengers has an atomic weight between 35 and 80; that is, the active scavenging ingredient is chlorine and/or bromine. Such scavengers include ethylene dibromide; ethylene dichloride; carbon tetrachloride; propylene dibromide; 2-chloro-2,3-dibromobutane; 1,2,2-tribromopropane; hexachloropropylene; mixed bromoxylenes; 1,4 - dibromobutane; 1,4 - dichloropentane; β,β'-dibromodiisopropyl ether; β,β'-dichlorodiethyl ether; trichlorobenzene; dibromotoluenes; tert-butyl bromide; 2-methyl - 2 - bromobutane; 2,3,3 - trimethyl - 2-bromobutane; tert-butyl chloride; 2,3-dimethyl-2,3-dibromobutane; 2,3 - dimethyl - 2,5 - dibromohexane; 2 - methyl-2,3-dichloroheptane; 2-methyl-2,4-dibromohexane; 2,4-dibromopentane; 2,5 - dichlorohexane; 3 - methyl - 2,4-dibromopentane; 1 - phenyl - 1 - bromoethane; 1 - phenyl-1 - chloroethane; ethyl - α - bromoacetate; diethyldibromomalonate; propyl - α - chlorobutyrate; 1,1 - dichloro-1 - nitroethane; 1,1 - dichloro - 2 - nitroethane; 1,1 - dibromo - 1 - nitrobutane; 2 - chloro - 4 - nitropentane; 2,4 - dibromo - 3 - nitropentane; 1 - chloro - 2 - hydroxyethane; 1 - bromo - 3 - hydroxypropane; 1 - bromo - 3-hydroxybutane; 3 - methyl - 2 - bromo - 4 - hydroxypentane; 3,4 - dimethyl - 2 - bromo - 4 - hydrooxypentane; and, in general, those disclosed in U. S. Patents 1,592,954; 1,668,022; 2,364,921; 2,479,900; 2,479,901; 2,479,902; 2,479,903; and 2,496,983. In short, it is preferred to employ halogenated scavengers containing only carbon and elements selected from the group consisting of hydrogen, bromine, chlorine, nitrogen and oxygen. Particularly preferred scavengers are healohydrocarbons, that is, bromohydrocarbons, chlorohydrocarbons, and bromochlorohydrocarbons having a vapor pressure from 0.1 to 250 millimeters of mercury at 50° C. The total amount of scavenger used is preferably from about 0.5 to about 2.0 theories, a theory being defined as the quantity required to react with the lead to form lead halide—i. e., 2 atoms of halogen per atom of lead. This amount can be in the form of a single compound or a mixture of compounds. However, when we use mixtures of bromine-containing and chlorine-containing scavengers, particularly bromo- and chlorohydrocarbons, we can employ a wider range of concentrations in the proportions described in U. S. Patent 2,398,281. Thus, the scavenger concentrations used are those which are sufficient to control the amount of deposits formed in the engine, particularly on the exhaust valves.

To prepare the improved antiknock compositions of this invention, the desired proportions of the ingredients are placed in a suitable container, such as a blending tank. To assure homogeneity, use is made of conventional methods of physical agitation, such as stirring, shaking or the like. The order of addition of the ingredients during formulation is not critical. Thus, an alkyllead compound may be added to the stabilizer, the stabilizer may be added to an alkyllead compound, or these ingredients may be introduced into the blending apparatus concurrently. When a scavenger complement is employed, it can be added to an alkyllead-stabilizer blend which has been pre-formed as described above or the scavenger complement can be introduced into the blender concurrently with the other ingredients. However, it is desirable to take advantage of the enhanced solubility of the stabilizer in or in the presence of scavengers and thereby reduce the time of the blending operation. This can be done by dissolving the stabilizer in the scavenger and blending this solution with an alkyllead compound, or by adding the stabilizer to a pre-formed mixture of an alkyllead compound and scavenger. The same blending procedures can be used when other ingredients are incorporated into the compositions of this invention.

Representative alkyllead antiknock compositions of this invention are presented in Table I. The figures following the representative ingredients are parts by weight. The two figures following the stabilizing ingredient show respectively the amounts whihc are used to obtain a composition containing 0.01 and 2.0 percent by weight of stabilizer based on the lead alkyl antiknock agent. If the lower figure is increased by a factor of 10, the resulting composition will contain 0.1 percent by weight of the stabilizing ingredient based on the lead alkyl, whereas one-half of the second figure provides a composition containing 1.0 percent. Should other concentrations be desired, the proper adjustments are evident.

Table I.—Antiknock fluid compositions

| Antiknock Agent | Scavenger | Stabilizer |
| --- | --- | --- |
| Tetramethyllead 267 | None | 4-Methoxy-2, 6-di-tert-butylphenol 0.027–5.34. |
| Do | Ethylene dibromide 226. | 4-Methoxy-2, 6-di-tert-amyl phenol 0.027–5.34. |
| Do | Ethylene dibromide 94 and ethylene dichloride 99. | 4-Methoxy-2, 6-di-(1,1-dimethylbutyl)-phenol 0.027–5.34. |
| Tetraethyllead 323 | None | 4-Methoxy-2, 6-di-tertbutylphenol 0.032–6.46. |
| Do | Ethylene dibromide 188. | Do. |
| Do | Ethylene dibromide 94 and ethylene dichloride 99. | Do. |
| Do | Ethylene dibromide 113 and ethylene dichloride 99. | Do. |
| Do | Mixed dibromotoluenes 200. | 4-Methoxy-2-tert-butyl-6-tert-amyl phenol 0.032–6.46 |
| Do | Mixed dibromotoluenes 125 and ethylene dichloride 99. | 4-Methoxy-2,6-di-(1,1,2,2-tetramethyl-propyl) phenol 0.032–6.46. |
| Do | Mixed dibromotoluenes 150 and 1,2,4-trichlorobenzenes 175. | 4-Methoxy-2, 6-di-(1,1,3,3-tetramethyl-butyl) phenol 0.032–6.46. |
| Do | Ethylene dibromide 94 and mixed trichlorobenzenes 146. | 4-Methoxy-2-tert-butyl-6-1-(1,1-dimethyl-heptyl) phenol 0.032–6.46. |
| Do | 1,4-Dibromobutane 216. | 4-Methoxy-2, 6-di-(1,1-dimethyldecyl)-phenol 0.032–6.46. |
| Do | 1,4-Dibromobutane 108 and 1,4-dichlorobutane 127. | 4-Methoxy-2, 6-di-tert-butylphenol 0.032–6.46. |
| Tetrapropyllead 379 | Acetylene tetrabromide 346. | 4-Methoxy-2, 6-di-tert-amyl phenol 0.038–7.58. |
| Dimethyldiethyllead 295. | β,β'-Dibromodiethyl ether 232. | 4-Methoxy-2-tert-butyl-6-(1-methyl-1-ethyl-hexyl) phenol 0.030–5.90. |
| Methyltriethyl-lead 309. | β,β'-Dibromodiisopropyl ether 130 and β,β'-dichloro-diethyl ether 143. | 4-Methoxy-2,6-di-tert-butylphenol 0.031–6.18. |

The antiknock fluid compositions shown in Table I are illustrative of the compositions of this invention. Other antiknock fluid compositions will now be apparent to one skilled in the art. In all instances the presence of the 4-methoxy-2,6-di-tert-alkyl phenol in the composition greatly enhances its stability characteristics as compared with those prevailing in the absence of such stabilizer.

To demonstrate the unexpected potency of 4-methoxy-2,6-di-tert-alkyl phenols as tetraalkyllead stabilizers, recourse was had to accelerated fluid storage tests. Portions of an antiknock fluid consisting essentially of tetraethyllead, 0.5 theory of bromine as ethylene dibromide and 1.0 theory of chlorine as ethylene dichloride were placed in glass bottles containing 80 percent outage; that is, the bottles contained 80 percent by volume of air. In one instance, 4-methoxy-2,6-di-tert-butyl phenol was blended with the above antiknock fluid so that the concentration of this stabilizer was 0.06 percent by weight based upon the weight of the tetraethyllead present. For comparative purposes another portion of the above antiknock fluid was treated with 4-methyl-2,6-di-tert-butylphenol, a widely used commercial antioxidant, this phenol likewise being present in amount equivalent to 0.06 percent by weight based upon the weight of tetraethyllead present. These samples were stored at 50° C. for a period of 168 hours. The amount of antiknock fluid decomposition which occurred during this stringent storage test was found by determining the ammonia-soluble lead contents of the samples by chemical analysis. Basically the method involves extracting from the samples all lead salts formed during storage by means of an ammonia-ammonium acetate solution and assaying the amount of such salts in the extract by conventional means. Thus, the method provides a reliable measure of the amount of decomposition which has occurred during the storage test described above. The results are shown graphically in Figure 1.

In Figure 1 the ordinate represents the amount by which tetraethyllead had decomposed during the above test procedure expressed in terms of grams of lead per each 100 milliliters of tetraethyllead. Thus, in Figure 1 the higher the bar, the greater was the amount of tetraethyllead decomposition. Referring now to Figure 1 it is seen that the typical antiknock fluid composition of this invention containing 4 - methoxy-2,6-di-tert-butylphenol—represented by the bar containing cross-hatching—only contained 0.07 gram of lead per 100 milliliters of tetraethyllead. In contrast, the antiknock fluid composition which contained the same concentration of 4-methyl-2,6-di-tert-butylphenol and represented by the unshaded bar contained 0.19 gram of lead per 100 milliliters of tetraethyllead. In other words, the antiknock fluid composition typical of this invention was almost three times as stable on a weight basis as a comparable composition containing 4-methyl-2,6-di-tert-butylphenol. That there was such a tremendous difference in effectiveness between the antiknock fluid composition of this invention and a very similar antiknock fluid composition is totally unexpected because the stabilizer of this invention—4-methoxy-2,6-di-tert-alkyl phenol— is chemically almost identical to the stabilizer to which it was compared, namely, 4-methyl-2,6-di-tert-butylphenol. It can be seen that the sole difference between these compounds is the fact that the stabilizer of this invention contains a methoxy group in the para or 4 position whereas the stabilizer not of this invention contains a methyl group in this position. Thus, despite the close similarity between the respective stabilizers it is clear that the stabilizer of this invention mutually cooperates with the other ingredients) of the improved antiknock fluid compositions of this invention, particularly the tetraalkyllead compound itself, and the resulting effect is that of greatly enhanced deterioration resistance.

In another series of storage tests conducted as described above comparisons were made between the above antiknock fluid with which had been blended 0.03 percent by weight based on the weight of tetraethyllead present of 4-methoxy-2,6-di-tert-butylphenol and another sample of the same antiknock fluid with which had been blended the same concentration of 4-methyl-2,6-di-tert-butylphenol. Again the stabilizer of this invention was much more effective in inhibiting deterioration of the antiknock fluid as shown by the fact that at this extremely low stabilizer concentration only 0.13 gram of lead per 100 milliliters of tetraethyllead was formed. In contrast, the sample containing the 4-methyl-2,6-di-tert-butylphenol contained almost twice as much lead decomposition products, namely, 0.25 gram of lead per 100 milliliters of tetraethyllead. By comparing the foregoing results it is also obvious that the stabilizer of this invention at a concentration of 0.03 percent by weight based on the weight of tetraethyllead present was more effective in inhibiting decomposition of the antiknock fluid than was twice the concentration of 4-methyl-2,6-di-tert-butylphenol. In view of the similarity of the chemical structures of these two stabilizers such remarkable difference in effectiveness is particularly striking.

Figure 2:
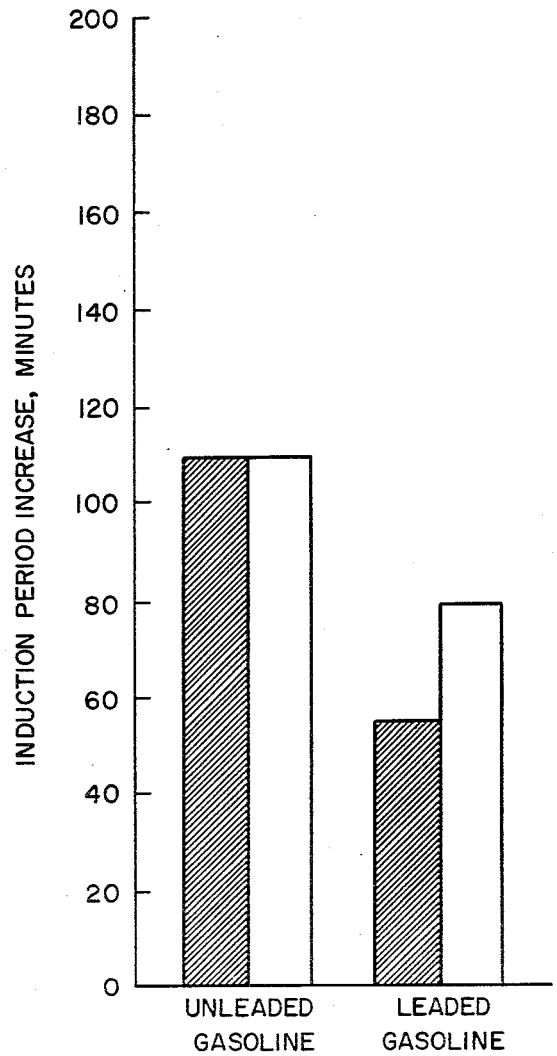

The high potency of the stabilizers of this invention in inhibiting deterioration of lead alkyl antiknock compositions is also particularly unexpected because 4-methoxy-2,6-di-tert-butylphenol was found to be equal to 4-methyl-2,6-di-tert-butylphenol in effectiveness as an antioxidant for unleaded gasoline and inferior when employed as an antioxidant for leaded gasoline. This was shown by conducting a series of tests using the standard ASTM Induction Period Method: ASTM Designation D–525 fully described in Part III–A, ASTM Standards for 1946. In one series of tests the fuel used was an unsaturated gasoline composed of a blend of 90 percent of catalytically cracked and 10 percent of polymer gasoline blending stocks. This fuel did not contain a lead alkyl antiknock agent, that is, the gasoline was unleaded and in this condition had an induction period of 80 minutes. To a sample of this unleaded unsaturated gasoline was added 4-methoxy-2,6-di-tert-butylphenol and to another sample was added 4-methyl-2,6-di-tert-butylphenol, both of these phenols being employed at a concentration of 4 milligrams per 100 milliliters of gasoline. In another series of tests a standard commercially available gasoline containing 3.0 milliliters of tetraethyllead per gallon was used. The tetraethyllead was present in this gasoline as an antiknock fluid consisting essentially of tetraethyllead, 0.5 theory of bromine as ethylene dibromide and 1.0 theory of chlorine as ethylene dichloride. The gasoline used in these latter tests was relatively stable against oxidative deterioration as shown by the fact that it possessed an induction period when leaded of 125 minutes. In this series of tests individual portions of the above leaded gasoline were treated with either 4-methoxy-2,6-di-tert-butylphenol or 4-methyl-2,6-di-tert-butylphenol. These stabilizers were used at a concentration of 3 pounds per 1000 barrels of gasoline. All of the above samples were then subjected to the induction period test, that is, the test gasolines were placed in a test bomb maintained at a temperature of 100° C. with an initial pressure of 100 pounds per square inch gage of oxygen. In this manner, the induction periods were determined, that is, the periods during which there was no drop in pressure indicating no absorption of oxygen. By comparing the induction periods obtained using the above test gasolines containing the inhibitors with the induction periods obtained on the same gasolines which did not contain inhibitors, the induction period increase was obtained. The induction period increase is the increase in the duration of the induction period caused by the addition of a protective substance to the test material, and is a direct measure of the protection afforded by such protective substances. Thus, the longer the induction period increase the more effective is the stabilizer. In Figure 2 are shown graphically the results of the above tests.

On the abscissa of Figure 2 are shown the types of media in which the inhibitors were used. The ordinate of Figure 2 is the induction period increase in minutes caused by the presence in these media of the respective stabilizers. Thus, the higher the bar, the more effective was the stabilizer in the particular medium. It is obvious from Figure 2 that in the above described unleaded gasoline 4-methoxy-2,6-di-tert-butylphenol was equal in effectiveness to 4-methyl-2,6-di-tert-butylphenol, both substances producing an induction period increase of 110 minutes. This would be expected in view of the close chemical similarity between the two inhibitors. Since 4-methyl-2,6-di-tert-butylphenol has achieved commercial success as a gasoline antioxidant the results of these tests establish that 4-methoxy-2,6-di-tert-butylphenol is particularly applicable to the stabilization of unsaturated gasoline and still more particularly cracked and polymer gasolines which tend to form undesirable gums during storage. Referring to the results of the tests using leaded gasoline shown in Figure 2 it is immediately apparent that 4-methoxy-2,6-di-tert-butylphenol is inferior to 4-methyl-2,6-di-tert-butylphenol as an antioxidant in leaded gasoline. This is established by the fact that 4-methoxy-2,6-di-tert-butylphenol produced an induction period increase of 55 minutes whereas the same concentration of 4-methyl 2,6-di-tert-butylphenol produced an induction period increase of 80 minutes. It is thus clear that while 4-methoxy-2,6-di-tert-butylphenol is equivalent to 4-methyl-2,6-tert-butylphenol as an antioxidant in unleaded gasoline, this equivalency no longer exists when the gasoline is leaded. Thus, in the leaded gasoline 4-methoxy-2,6-di-tert-butylphenol gave inferior results as compared with the results obtained when using 4-methyl-2,6-di-tert-butylphenol. On the basis of these results it might be expected that 4-methoxy-2,6-di-tert-butylphenol would be inferior to 4-methyl-2,6-di-tert-butylphenol as a stabilizer of tetraalkyllead antiknock compositions in which the concentration of tetraalkyllead is so much higher than in leaded gasoline. But as shown by the results presented in Figure 1, 4 - methoxy-2,6-di-tert-butylphenol possesses outstanding effectiveness as an inhibitor of deterioration of tetraalkyllead antiknock compositions.

The results described above showing the pre-eminence of illustrative antiknock compositions of this invention from the standpoint of resistance of oxidative deterioration typify the results obtained by the practice of this invention. Generally speaking, good results are obtained with other compositions of this invention, such as those shown in Table I although as pointed out earlier 4-methoxy-2,6-di-tert-butylphenol is the most effective lead alkyl stabilizer of this invention and for this reason is particularly preferred.

The 4-methoxy-2,6-di-tert-alkyl phenol stabilizers of this invention include such compounds as 4-methoxy-2,6-tert-butylphenol; 4-methoxy-2,6-di-tert-amyl phenol; 4-methoxy - 2,6-di - (1,1,2,2-tetramethylpropyl)phenol; 4-methoxy - 2,6 - di - (1,1,3,3 - tetramethylbutyl)phenol; 4 - methoxy - 2 - tert - butyl - 6 - tert - amyl phenol; 4-methoxy - 2 - tert - butyl - 6 - (1,1,2,2-tetramethylpropyl) phenol and the like, as well as mixtures of such compounds. These compounds can be prepared by alkylating 4-methoxy phenol with the appropriate olefinic hydrocarbon according to the process set forth in our copending application Serial No. 426,556, filed April 29, 1954.

The stabilizers of this invention are soluble in lead alkyls and lead alkyl antiknock fluids in excess of the amounts normally used to impart improved stability thereto. Thus, additional solvents are ordinarly unnecessary. Under special conditions, such as use of the stabilizer at very high concentration where blending is to occur at sub-zero temperatures, a solvent may be advantageously employed. Particularly suitable solvents include acetone, methyl ethyl ketone, methanol, ethanol, isopropanol, methyl isobutyl carbinol, benzene, toluene, xylene and the like. In general, ketones and alcohols containing up to about 6 carbon atoms and aromatic hydrocarbons containing from 6 to 18 carbon atoms are excellent solvents. The stabilizers of this invention readily dissolve in such solvents to concentrations of 40 to 50 percent by weight.

The resulting liquid formulations are useful in large scale blending operations and possess the advantage that they can be stored using reasonable precautions until such time as they are used without fear of deterioration.

The antiknock compositions of this invention may contain other ingredients, such as dyes, for identification purposes; metal deactivators, such as N,N'-di-salicylidene-1,2-aminopropane, etc.; other antiknock agents, such as the carbonyls of iron, nickel, and like elements, aromatic amines, such as N-methyl aniline, xylidine, etc.; anti-icing and anti-rust additives; surface ignition control additives, such as esters of phosphorus acids; and the like.

As stated above, the compositions of this invention are generally used in gasoline-type fuel in amount such that there is from about 0.5 to about 6.5 grams of lead per gallon.

We claim:

1. An antiknock composition consisting essentially of an alkyllead antiknock compound and, as a stabilizer therefor, a small stabilizing amount of a 4-methoxy-2,6-di-tert-alkyl phenol in which the alkyl groups contain from 4 to 8 carbon atoms.

2. The composition of claim 1 in which said alkyllead compound is tetraethyllead.

3. An antiknock composition consisting essentially of tetraethyllead, about 0.5 theory of bromine as ethylene dibromide, about 1.0 theory of chlorine as ethylene dichloride and from about 0.01 to about 2.0 percent by weight based on the weight of the tetraethyllead of 4-methoxy-2,6-di-tert-butylphenol.

4. An antiknock composition consisting essentially of tetraethyllead, from 0.5 to 2.0 theories of lead scavenging material in the form of organic halide that reacts with the lead during combustion in an engine, to form volatile lead halide, an an amount of 4-methoxy-2,6-di-tert-butyl phenol sufficient to stabilize the tetraethyllead against premature decomposition.

References Cited in the file of this patent

UNITED STATES PATENTS

| | | |
|---|---|---|
| 2,618,612 | Howell et al. | Nov. 18, 1952 |
| 2,679,459 | Rosenwald | May 25, 1954 |
| 2,707,154 | Lehmann et al. | Apr. 26, 1955 |